(12) United States Patent
Lay et al.

(10) Patent No.: US 8,118,521 B2
(45) Date of Patent: Feb. 21, 2012

(54) DRILLING APPARATUS

(75) Inventors: Norbert Lay, Bondorf (DE); Marcus Eberle, Stuttgart (DE); Martin Strasser, Bad Duerrheim (DE)

(73) Assignee: MV Marketing und Vertriebs-GmbH & Co. KG Wielaender + Schill, Villingen-Schwenningen (DE)

( * ) Notice: Subject to any disclaimer, the term of this patent is extended or adjusted under 35 U.S.C. 154(b) by 1214 days.

(21) Appl. No.: 11/837,258

(22) Filed: Aug. 10, 2007

(65) Prior Publication Data
US 2008/0056833 A1 Mar. 6, 2008

(30) Foreign Application Priority Data

Aug. 11, 2006 (DE) .......................... 10 2006 037 910
Oct. 26, 2006 (DE) .......................... 10 2006 050 432

(51) Int. Cl.
*B23B 45/00* (2006.01)
*B23B 45/14* (2006.01)
(52) U.S. Cl. ........................ 408/76; 408/111; 408/136
(58) Field of Classification Search .................. 408/76, 408/88, 97, 110, 111, 124, 136
See application file for complete search history.

(56) References Cited

U.S. PATENT DOCUMENTS

| | | | | |
|---|---|---|---|---|
| 2,525,387 A * | 10/1950 | Volk | ................................ | 33/370 |
| 2,622,457 A * | 12/1952 | Buck | ................................ | 408/76 |
| 2,879,678 A * | 3/1959 | Kaiser, Jr. | ....................... | 408/76 |
| 3,387,509 A * | 6/1968 | Lupear | .............................. | 408/76 |
| 3,500,707 A * | 3/1970 | Warren | .......................... | 408/135 |
| 4,189,268 A * | 2/1980 | Hackman et al. | .............. | 409/183 |
| 4,325,696 A * | 4/1982 | Rosenstatter et al. | ......... | 433/133 |
| 4,740,119 A * | 4/1988 | Lierz | .............................. | 408/111 |
| 5,056,966 A * | 10/1991 | Lee | ........................... | 408/115 R |
| 5,346,334 A * | 9/1994 | Einaru et al. | ................... | 405/269 |
| 5,533,842 A * | 7/1996 | Johnson et al. | ................. | 408/17 |
| 5,746,553 A * | 5/1998 | Engwall | ......................... | 409/132 |
| 6,810,596 B2 * | 11/2004 | Fung et al. | ...................... | 33/334 |
| 2005/0276670 A1 * | 12/2005 | Freund | .......................... | 408/129 |

FOREIGN PATENT DOCUMENTS

| | | |
|---|---|---|
| DE | 806749 | 6/1951 |
| DE | 42 18 982 A1 | 7/1993 |
| DE | G 93 18 014.4 | 11/1993 |
| DE | 93 18 014.4 U1 | 3/1994 |
| DE | 198 45 530 A1 | 4/1999 |
| DE | 100 53 518 A1 | 5/2002 |
| DE | 102 30 052 A1 | 5/2003 |
| FR | 2318011 | 7/1975 |
| JP | 07186136 | 7/1995 |

OTHER PUBLICATIONS

Thomas Schenk, "German Office Action for Application No. 10 2006 050 432.1-14", Nov. 27, 2009, Publisher: German Patent Office, Published in: DE.

* cited by examiner

*Primary Examiner* — David Bryant
*Assistant Examiner* — Paul M Janeski
(74) *Attorney, Agent, or Firm* — DeMont & Breyer, LLC (57) ABSTRACT

The invention relates to a drilling apparatus which is held firmly on the workpiece by means of feet, and which has a step-down transmission for easier manual feeding.

19 Claims, 8 Drawing Sheets

Fig. 8

DRILLING APPARATUS

FIELD OF THE INVENTION

The invention relates to a drilling apparatus, in particular to a drilling apparatus for machining metal bodywork panels.

BACKGROUND TO THE INVENTION

It is known from practice for holes to be incorporated in metal bodywork panels using a hand drilling machine. A procedure such as this has been found to have the disadvantage that, on the one hand, it is often difficult when using hand drilling machines to align the tool at right angles to the surface to be machined, and to keep it aligned. A drill inclined at an angle results in the drill becoming damaged much more quickly, for example by the edges being broken out or the drill running away, which can damage a large area of the metal panel.

Furthermore, particularly in the case of high-strength metal panels, the force which is required to feed the drill is quite high. This results in the user becoming tired quickly.

German Utility Model Specification DE 9318041 (IJOT Verbindungstechnik GmbH & Co. KG) has disclosed a machine tool which has suction cups in order to hold it firmly on the surface to be machined, and which has a pneumatic feed device.

A pneumatic system such as this has the disadvantage that, on the one hand, it is very complex, and leads to a tool which is very heavy and large. Furthermore, this machine tool can be held only inadequately in its position by the user if the suction cups become detached from the surface to be machined. This can lead to damage to the workpiece resulting from movement of the machine tool.

OBJECT OF THE INVENTION

In contrast, the invention is based on the object of reducing the stated disadvantages of the prior art.

In particular, one object of the invention is to provide a drilling apparatus with manually operated feed, which can be operated by the user with little force being applied.

A further object of the invention is to ensure that the drill is guided vertically.

A further object of the invention is to lengthen the lives of the drills which are clamped in the drilling apparatus.

A further object of the invention is to provide means which signal to the user that the feed force is excessive and can lead to damage to the drill or to nonuniform holes.

SUMMARY OF THE INVENTION

The object of the invention is achieved just by a drilling apparatus as claimed in one of the independent claims.

Preferred embodiments and developments of the invention are specified in the respective dependent claims.

According to the patent, a drilling apparatus is provided which, in particular, is designed to machine metal bodywork panels.

The drilling apparatus has a drill which is connected to a drive motor. The drive motor is preferably a compressed-air-operated drive spindle, since motors such as these can be produced in an extremely compact form. Alternatively, an electric motor can also be used.

Furthermore, the drilling apparatus has at least one handle, and preferably two handles, for manually holding the drilling apparatus. These handles preferably project in a T-shape from the drilling apparatus, so that the drilling apparatus can be held on the two handles.

Furthermore, the drilling apparatus has means for temporarily holding the drilling apparatus firmly on the workpiece to be machined, in which case the drill can be moved essentially axially relative to the means for temporarily holding the drilling apparatus firmly, by means of the handle or handles.

The drilling apparatus is therefore held firmly on the workpiece by the means for temporarily holding the drilling apparatus firmly, and a force can be exerted on the drilling spindle via the handles, thus providing the feed for the drill.

According to the invention, the at least one handle, in particular the two handles, is or are coupled to the drill via a step-down transmission. The step-down transmission means that the feed rate of the drill is reduced when pressure is applied to the handle, thus correspondingly reducing the force which the user must apply.

The provision of a step-down transmission is made possible, inter alia, by the fact that the drilling apparatus is, so to speak, held firmly on the workpiece and is designed to absorb the force which is required for feeding.

This refinement furthermore has the advantage that, if the exerted force exceeds the force for which the means for temporarily holding the drilling apparatus firmly are designed, these means are lifted off the workpiece. If the holding means are lifted off, the user is made aware of the fact that the feed force is excessive, and can appropriately reduce it. This ensures that the drill is not operated at an excessive feed rate.

In one preferred embodiment of the invention, the step-down transmission is in the form of a lever transmission. In this case, the handles are preferably used as a lever arm and act on the drill. A lever transmission such as this requires a comparatively simple mechanism and at the same time makes use of the lever effect of the handles, which in any case are positioned relatively far apart from one another, in order to guide the tool better.

The step-down transmission ratio in one preferred embodiment of the invention is more than 1.5, preferably more than 2 and particularly preferably more than 3.

In one development of the invention, a non-linear step-down transmission can be provided, for example in order to allow the drill to be fed in a more finely-sensing form and with less force while drilling, while in contrast the step-down transmission ratio is then increased, and the force to be applied falls.

A drill having at least two stages is advantageous. In this case, pilot drilling is carried out using a first stage.

The means for temporarily holding the drilling apparatus firmly in one preferred embodiment of the invention comprise feet.

The drilling apparatus preferably has two or three feet.

The feet can preferably also be moved relative to the drill by means of the handles of the drilling apparatus.

In one development of the invention, a stop on the drilling apparatus can be placed on the workpiece, and the feet can be moved behind the stop by means of the handles of the drilling apparatus, and can be lifted off the workpiece in this way.

This embodiment has the advantage that the feet can be detached from the workpiece by means of the drilling apparatus handles.

This is particularly advantageous in the case of magnetic feet, such as those provided for one preferred embodiment to the invention, since strong magnets are used because of the high forces that need to be applied.

The step-down transmission of the drilling apparatus can also be used to lift the feet off relatively easily when strong magnets are used.

Since the magnetic force decreases to a major extent even at a short distance, the feet need be lifted off only by a few millimeters, and the complete drilling apparatus can then easily be lifted off the workpiece.

Electromagnets can also be used as an alternative to or in combination with permanent magnets, and can be switched on and off by the user.

The magnets are preferably provided with at least one pull-off film in order to protect the surface of the workpiece to be machined and in order to allow swarf to be removed easily after drilling.

In one alternative embodiment of the invention, suction cups are provided as feet for machining non-magnetic surfaces. In particular, provision is made for suction cups such as these to be controlled via a pneumatic system integrated in the appliance.

In one particular embodiment of the invention, provision is made for the tool to be held on the edges of the workpiece by means of suction cups or clamping apparatuses, in particular when machining non-magnetic workpieces.

In one development of the invention, in particular one and preferably all the feet can be lifted off.

On the one hand, this allows different feet to be fitted for different purposes, for example with a magnetic force of different strength.

However, a situation can also arise in which a hole must be made in a corner which the tool cannot reach because of its feet. The user can then remove the feet, and can place the drill in place without the feet. Although the step-down transmission is then no longer available, the drilling apparatus can, however, be used like a normal hand drilling machine.

In one development of the invention, the drilling apparatus has two feet, with the drill being arranged offset from a straight line which connects the center points of the feet to one another. In particular, the drill is located essentially on or offset from a straight line which rests tangentially on the feet. This means that the drilling apparatus can drill a hole directly adjacent to an edge without having to remove the feet.

The feet are preferably in the form of articulated feet in order to allow them to be matched to curved surfaces.

In order to allow the drill to be aligned better, at least one foot can preferably be rotated.

In one development of the invention, the drilling apparatus has a stop for placing on the workpiece, with the stop having a marking for a drilling point. In particular, the drilling point is marked by a target cross.

In one alternative embodiment of the invention, the drilling point can also be marked by means of a light spot, in particular user a diode laser.

The stop can also preferably be designed such that it can be removed in order to fit different stops for different tasks and in order to completely remove the stop for specific purposes.

In one development of the invention, at least one switch for operating the drill is arranged in the drilling apparatus handle. There is therefore no need for the user to remove his hand from the drilling apparatus handles in order to operate the drilling machine.

In one development of the invention, switches to switch electromagnets that are arranged on the feet on and off, or to switch the pneumatic system for suction cups which are arranged on the feet on and off are also provided.

The drilling apparatus can also be operated by foot-operated switches, alternately or in combination.

In one development of the invention, the drilling apparatus also has a guide bar which can be placed on the workpiece. In this case, the guide bar has cutouts for the drill and guide means for the feet of the drilling apparatus.

The points to be drilled can therefore be marked accurately before the drill is positioned, and the drilling apparatus can then be inserted into the guide bar, in order to drill the holes.

As provided in one particular embodiment of the invention, the guide bar may be in the form of a magnetic bar in order to allow it to be attached to magnetic workpieces.

The guide bar can also be attached to the workpiece in a different way, alternatively or in combination.

A further embodiment of the provides for a ferromagnetic or magnetic bar to be used, which can also be fitted to a non-ferromagnetic workpiece. The guide bar can thus be clamped on, for example via grippers, or can be adhesively bonded.

Since, at least in places, the guide bar is ferromagnetic or has magnets, a drilling apparatus with magnetic feet can also be used on workpieces which do not have ferromagnetic characteristics.

In one development of the invention, the guide means can be adjusted on the guide bar, and can thus be individually matched.

According to the invention, a drilling apparatus can be provided in which the drill has a maximum of 10°, preferably 5° and particularly preferably 2.5°, tolerance with respect to the normal to the workpiece. This maximum discrepancy from the ideal angle at which the drill is positioned is achieved by the guidance of the drill in the drilling apparatus according to the invention.

In one development of the invention, the drilling apparatus is modular and preferably has a drilling module which comprises the drill and the drive device, a housing module in which the drilling module is inserted, a foot module for the means for temporarily holding the drilling apparatus firmly on the workpiece, and a pulling module, which comprises the step-down transmission.

The drill is in this case preferably interchangeable with the drilling module installed in the housing module.

The invention also relates to a drilling apparatus, in particular to a drilling apparatus having one or more of the features described above. The drilling apparatus has at least one foot for temporarily holding it firmly on a workpiece. According to the invention, the at least one foot can be lifted off the workpiece by means of a step-down transmission, in particular by means of a lever transmission.

This makes it considerably easier to remove the drilling apparatus, particularly when using magnetic feet.

BRIEF DESCRIPTION OF THE DRAWINGS

The invention will be explained in more detail in the following text with reference to one exemplary embodiment and using the drawings in FIG. 1 to FIG. 7, in which.

DETAILED DESCRIPTION OF THE DRAWINGS

The major components of the drilling apparatus 1 will be explained in more detail with reference to FIG. 1, which schematically shows a perspective view of one exemplary embodiment of a drilling apparatus 1 according to the invention.

The drilling apparatus 1 has a drill 2 which is connected to a drilling spindle 11, but is used as a drive for the drill 2. The drilling spindle 11 can move axially in a housing 8. For this purpose, the drilling spindle 11 is itself installed in a housing 21, and can be pulled out upwards once the screws 12 have been released.

A stop 7 on the drilling apparatus 1 can be placed on the workpiece (not illustrated), and has magnetic feet 4 for holding it firmly on the workpiece.

As a step-down transmission, the drilling apparatus 1 has a lever transmission, which has handles 3 for manually holding the drilling apparatus 1, which handles 3 are attached to the joints 5 via the lever arms 10, which have an elongated hole. The joints 5 are fitted to the outer housing 8 of the drilling apparatus 1.

The housing 21 of the drilling spindle 11 or of the drilling spindles runs in a guide link 9 of the lever arms 10.

If the handles 3 are now moved downwards, then the drilling spindle 11 is moved axially with respect to the housing 8.

The step-down transmission ratio of the lever transmission in this exemplary embodiment is about 3.

The lever arms 10 are connected to the connecting rods 13, which are themselves connected to the feet 4 via the joints 6.

If the user (not illustrated) places the stop 7 of the drilling apparatus 1 on the workpiece and moves the handles 3 in the direction of the workpiece, the feet 4 are first of all placed on the workpiece surface (not illustrated). From this time, the tool is held firmly on the workpiece by the feet 4, which are in the form of magnetic feet. The drill 2 is at the same time pushed forwards with the feet 4, but does not yet penetrate into the workpiece (not illustrated) until the feet 4 are in place.

The drill 2 is now pushed further forwards by pushing the handles 3 down further, and penetrates into the workpiece in order to drill the hole. During drilling, the drilling apparatus 1 is held firmly on the workpiece by the magnetic feet.

If the force exerted exceeds the holding force of the feet 4, the feet are lifted off the workpiece, and the user now knows that he must reduce the force.

The procedure for removal of the drilling apparatus 1 is carried out in the opposite sequence. First of all, the drill 2 is raised out of the workpiece by lifting the handles 2. When the handles are approximately horizontal, the tip of the drill is already above the workpiece. If the user moves the handles 3 further upwards, the feet 4 are lifted off the workpiece by the stop 7 being pressed against the workpiece, with the drilling apparatus being released in the process.

Figure 2:
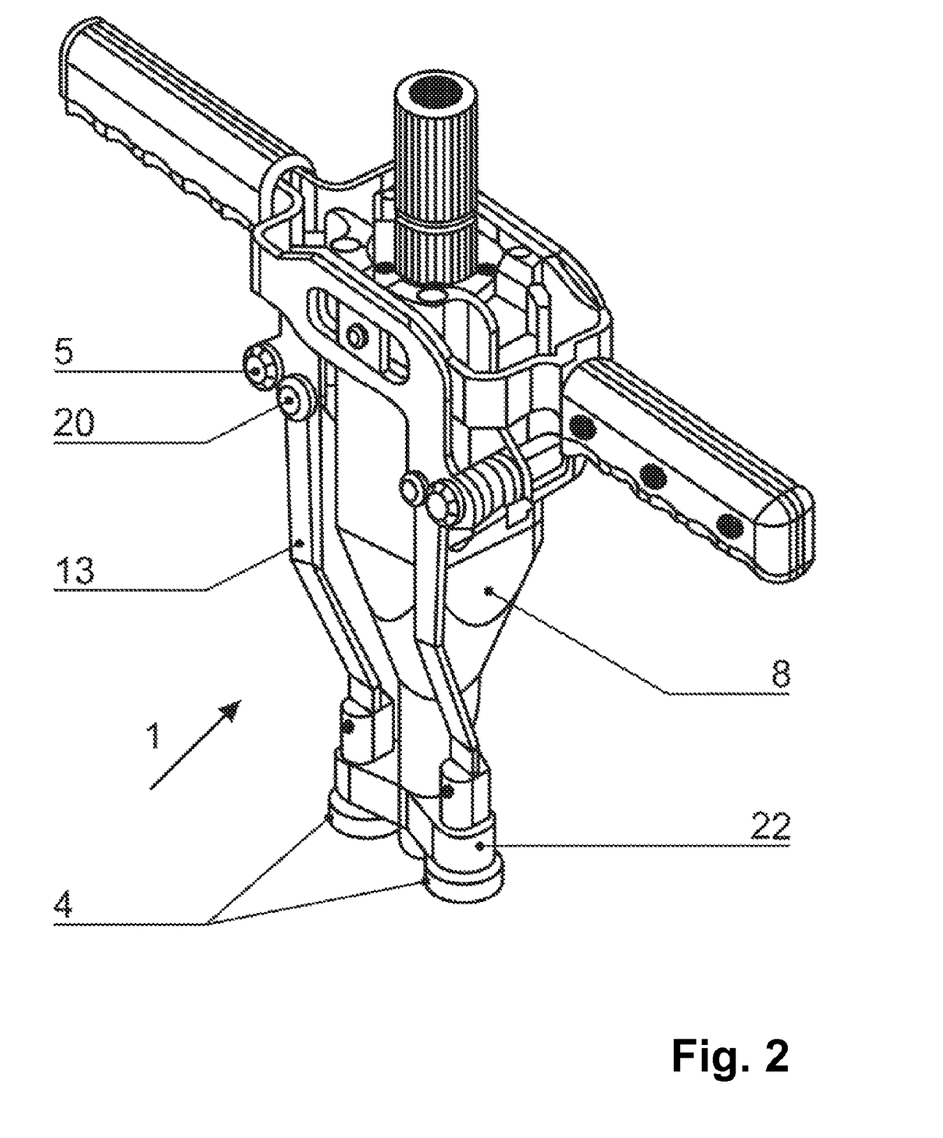
FIG. 2 shows a further schematic view of a drilling apparatus, in the form of a perspective illustration.

The mechanism of the feet 4 will be explained in more detail with reference to FIG. 2. The feet 4 are connected via the connecting rods 13 to the lever arms 10 via the joints 20. The movement mechanism for the feet 4 is in the form of a toggle-lever joint.

The feet 4 are therefore likewise moved via a lever transmission. The feet are also guided in a guide 22, which is connected to the housing 8.

The connecting rods 13 have elongated holes (which cannot be seen), in which the feet 4 are mounted, at the joints 6. When the drill is now pushed further forwards after placement of the feet, the guide rods 13 run in the elongated holes. The feet 4 in consequence do not move any further forward, at least beyond a limited distance, after being put in place.

The stop (7 in FIG. 1) therefore remains on the surface of the workpiece.

Figure 1:
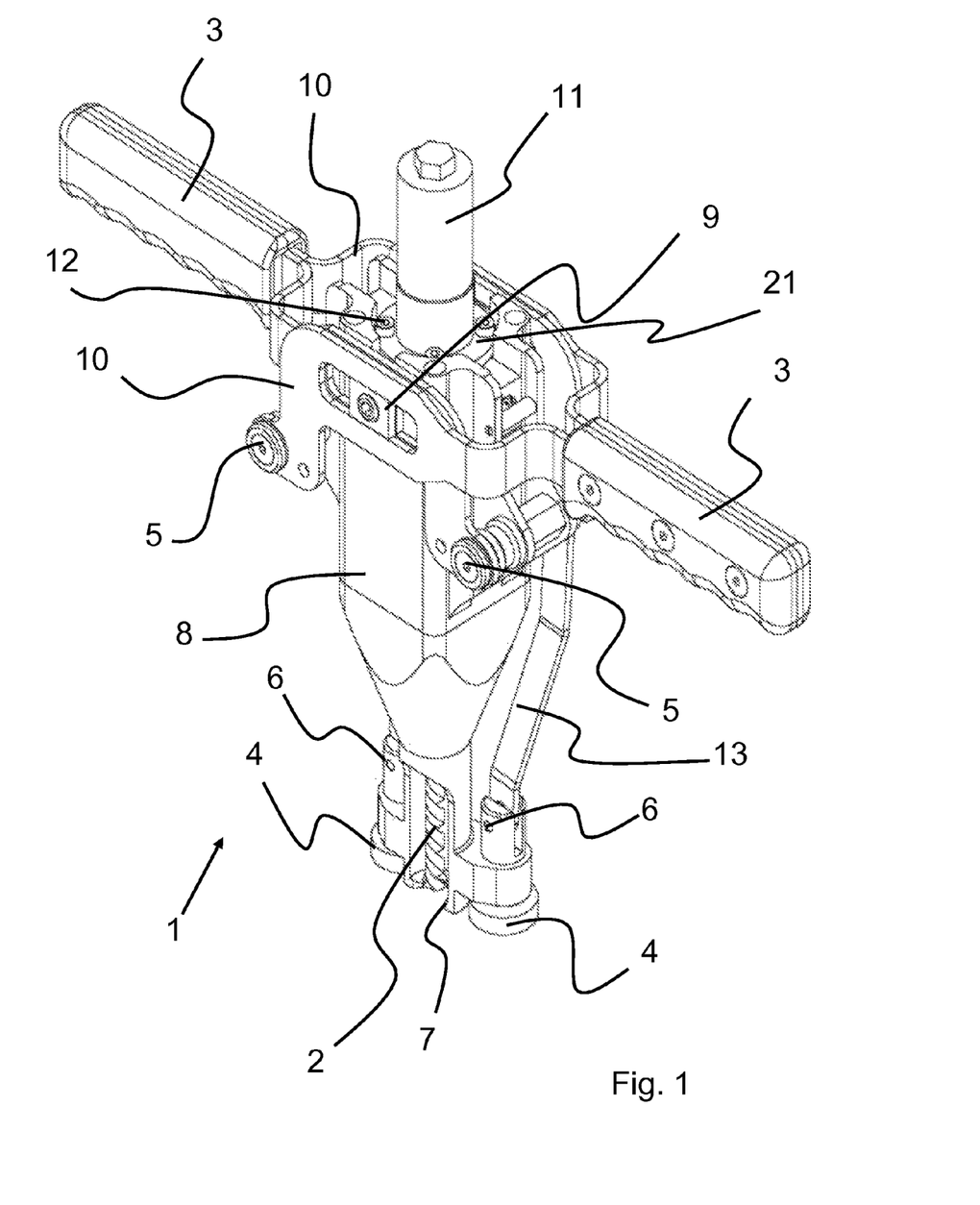
FIG. 1 shows a schematic view of a drilling apparatus, in the form of a perspective illustration.
Figure 3:
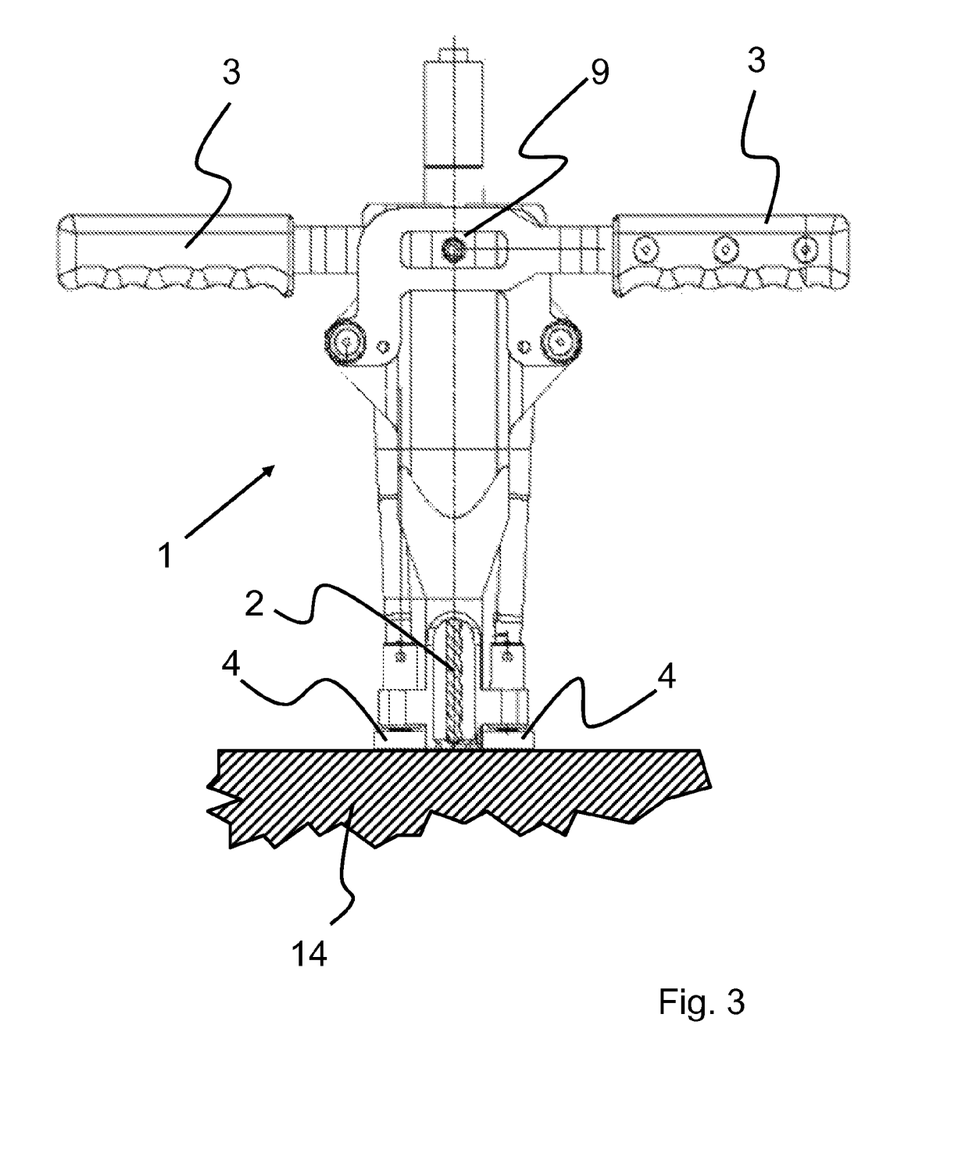
FIG. 3 shows a schematic view of one exemplary embodiment of a drilling apparatus, in the form of a side view.

FIG. 3 shows an illustration from the side of the drilling apparatus shown in FIG. 1. In this case, the drilling apparatus 1 has been placed on the surface of a workpiece 14. The handles 3 have already been pushed forwards sufficiently that the feet 4, which are in the form of magnetic feet, are resting on the surface of the workpiece 14. When the handles are pushed down further, a feed force is produced, resulting in the drill 3 penetrating into the workpiece 14.

In addition to the mechanical components, the drilling apparatus may have electrical and electronic components such as sensors for monitoring purposes, for example a depth indication for the drill (not illustrated), pressure sensors which monitor the feed force, and/or a rotation-speed indication (not illustrated).

Figure 4:
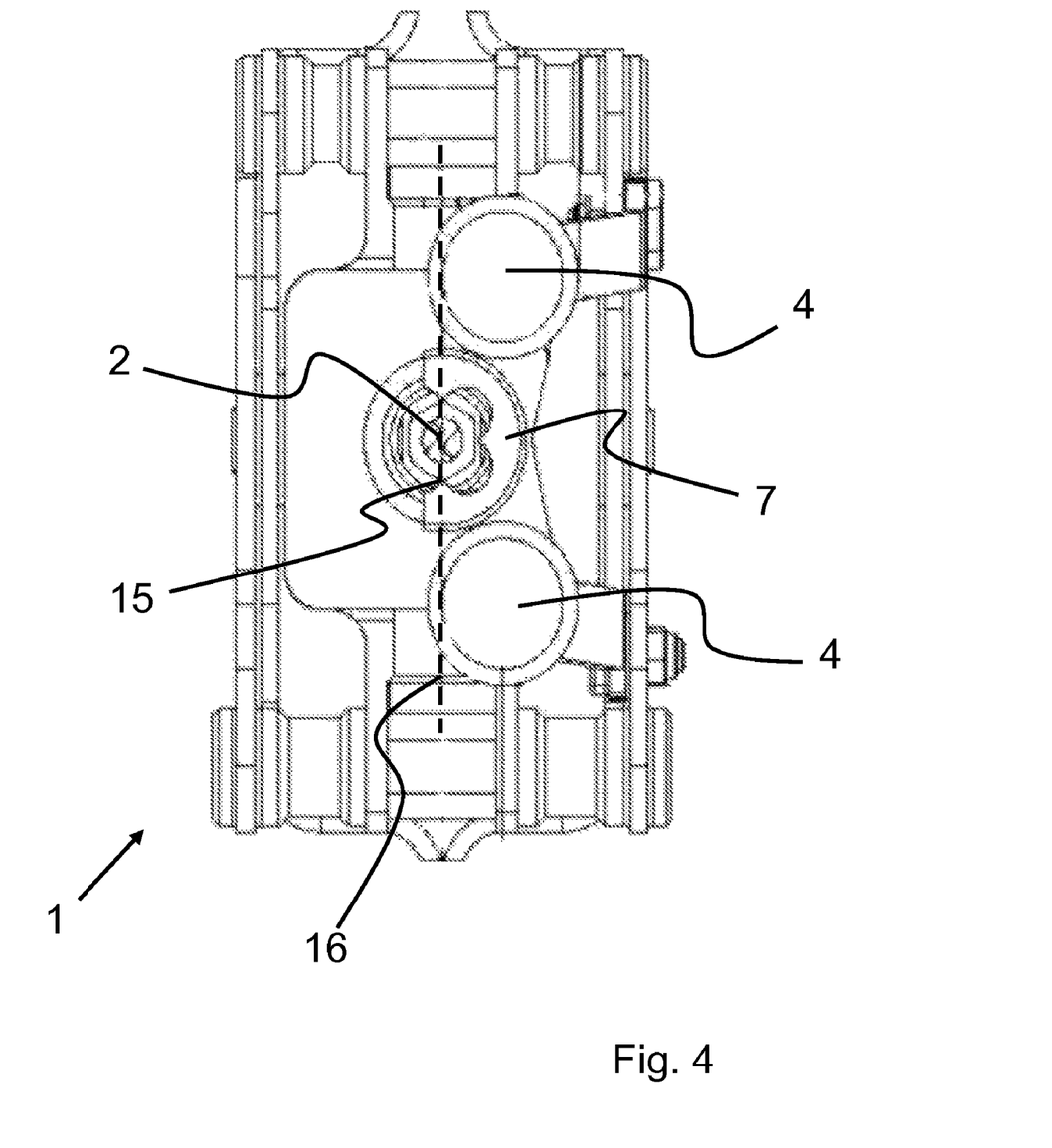
FIG. 4 shows a schematic view of one exemplary embodiment of a drilling apparatus from underneath.

The apparatus for temporarily holding the drilling apparatus firmly will be explained, in particular, in more detail with reference to FIG. 4, which shows the drilling apparatus 1 in the form of a plan view from the foot side.

The figure shows two magnetic feet 4, which can be placed on the workpiece surface (not illustrated), and the drill 2.

The drilling apparatus 1 furthermore has a stop 7 which comprises tips 15 in order to form a target cross. The tip of the drill 2, whose position is marked via the stop 7, is located essentially on the dashed line 16, which rests tangentially on the feet 4. It is therefore possible to drill directly as far as an edge.

Furthermore, in order to allow better adjustment of the tool, the feet 4 can be rotated about a specific axis.

In a further embodiment of the invention, the entire foot module can be rotated with respect to the housing of the drilling apparatus (not illustrated).

Figure 5:
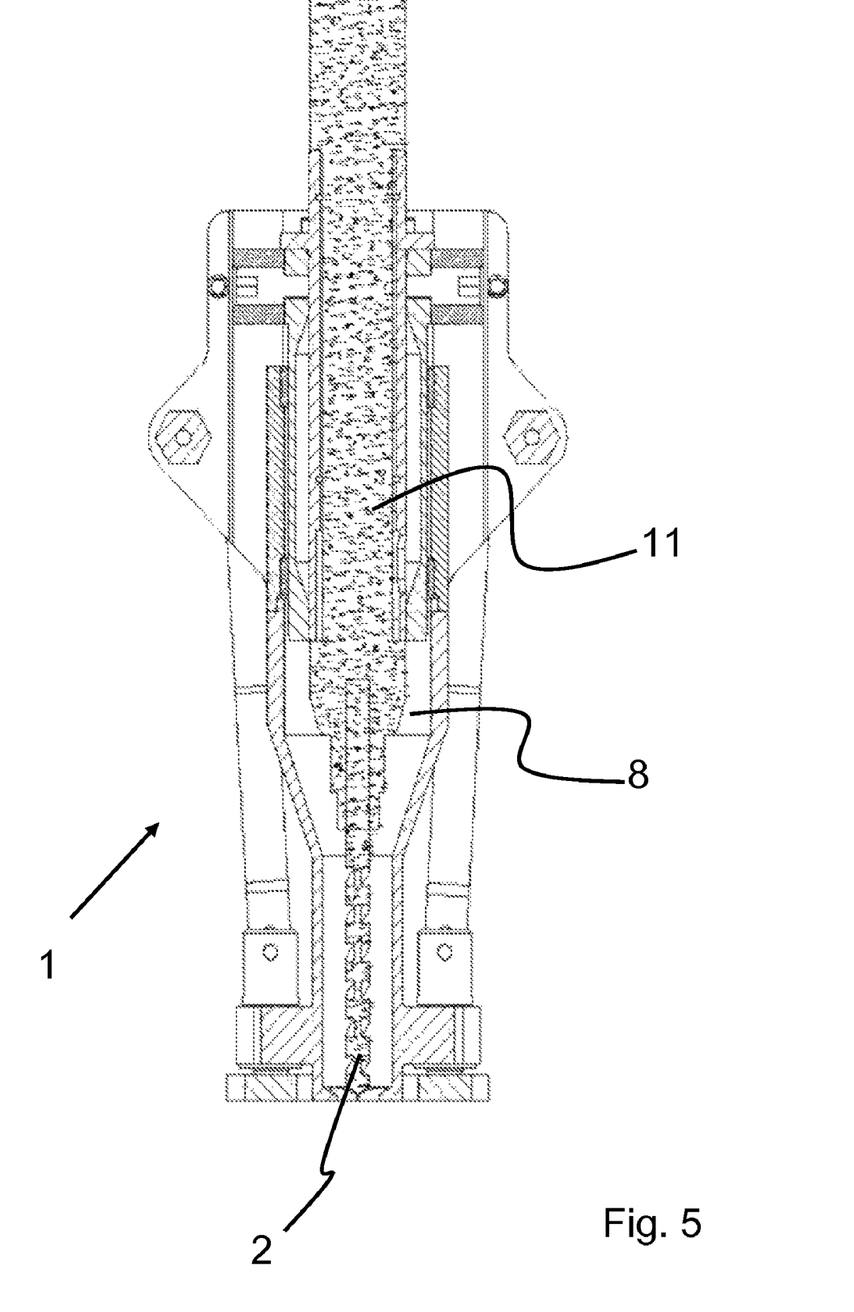
FIG. 5 shows a schematic section illustration of one exemplary embodiment of a drilling apparatus according to the invention.

FIG. 5 shows, schematically, a section view of a drilling apparatus 1 according to the invention. In particular, this shows how the drilling spindle 11 is installed in the housing, and is connected to the drill 2. The drilling spindle 11 has a mechanism by means of which the drill 2 can be replaced without having to screw the spindle out of the housing 8.

Figure 6:
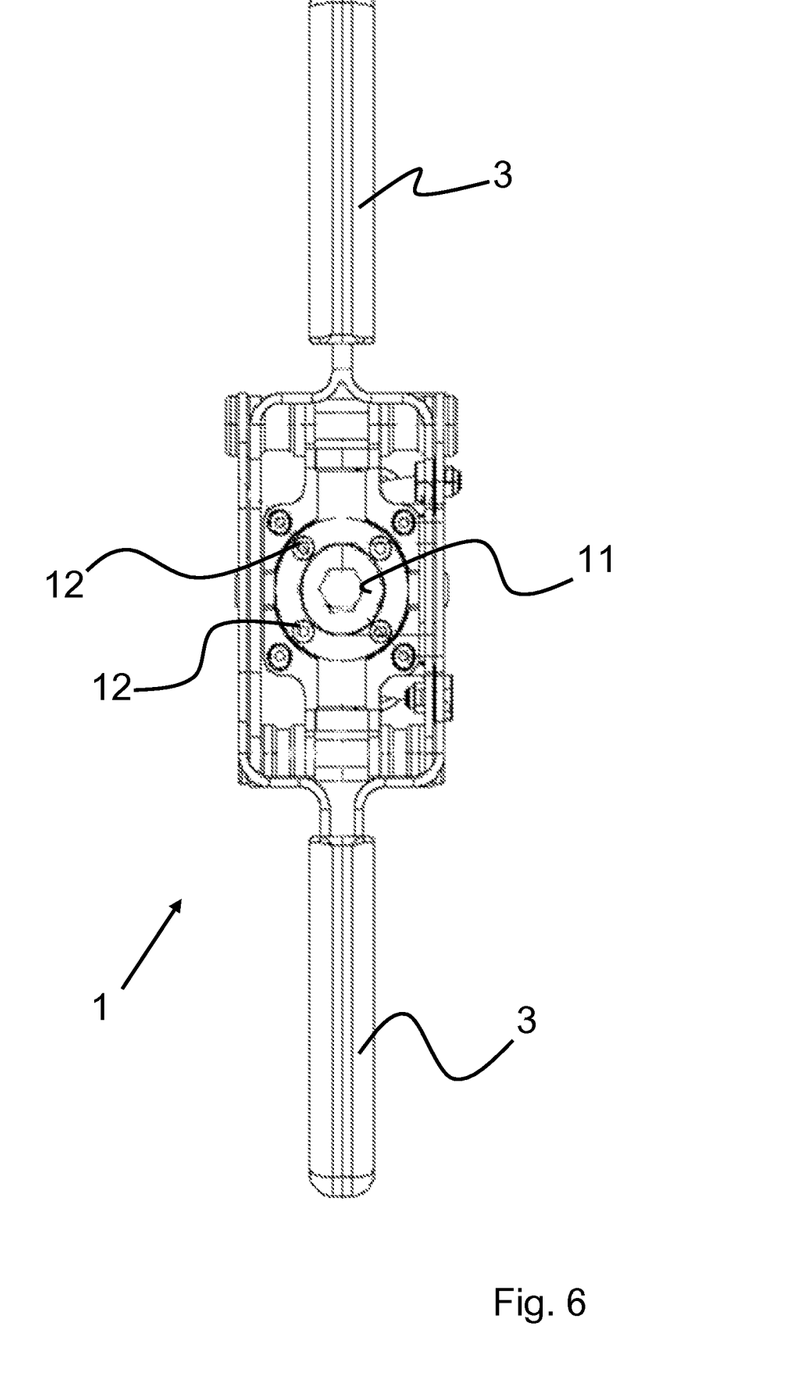
FIG. 6 shows a schematic plan view of one exemplary embodiment of a drilling apparatus according to the invention, from above.

FIG. 6 shows, schematically, one embodiment of a drilling apparatus 1 according to the invention, in the form of a plan view from above. This shows the handles 3, which project approximately in a T-shape in the upper area of the drilling apparatus and essentially at right angles from the drilling apparatus 1. The drilling spindle 11 can be removed upward, once the screws 12 have been released.

Figure 7:
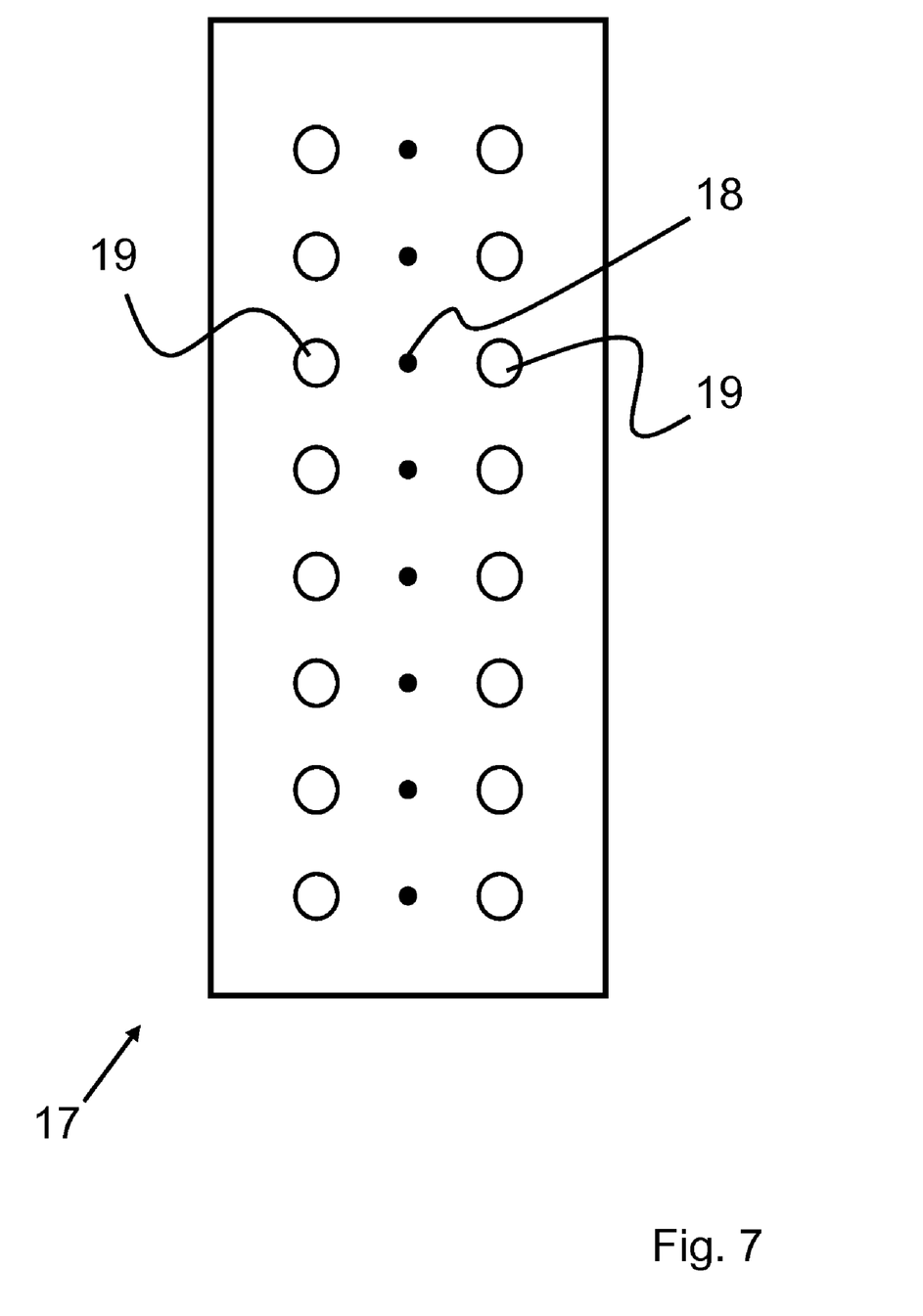
FIG. 7 shows a schematic illustration of one embodiment of a bar according to the invention for guiding the drilling apparatus.

FIG. 7 shows, schematically, a guide bar 17 as can be used for more accurate adjustment of the drill or in order to use the tool on a non-ferromagnetic surface, for example aluminum bodywork.

The guide bar 17 is formed from ferromagnetic material and has cutouts 18 in order to mark the holes to be drilled, as well as guide means 19 for holding the feet of the drilling apparatus (not illustrated).

Furthermore, the guide bar 17 can also be attached by means of grippers (not illustrated) to non-magnetic workpieces. This allows all materials to be machined.

Figure 8:
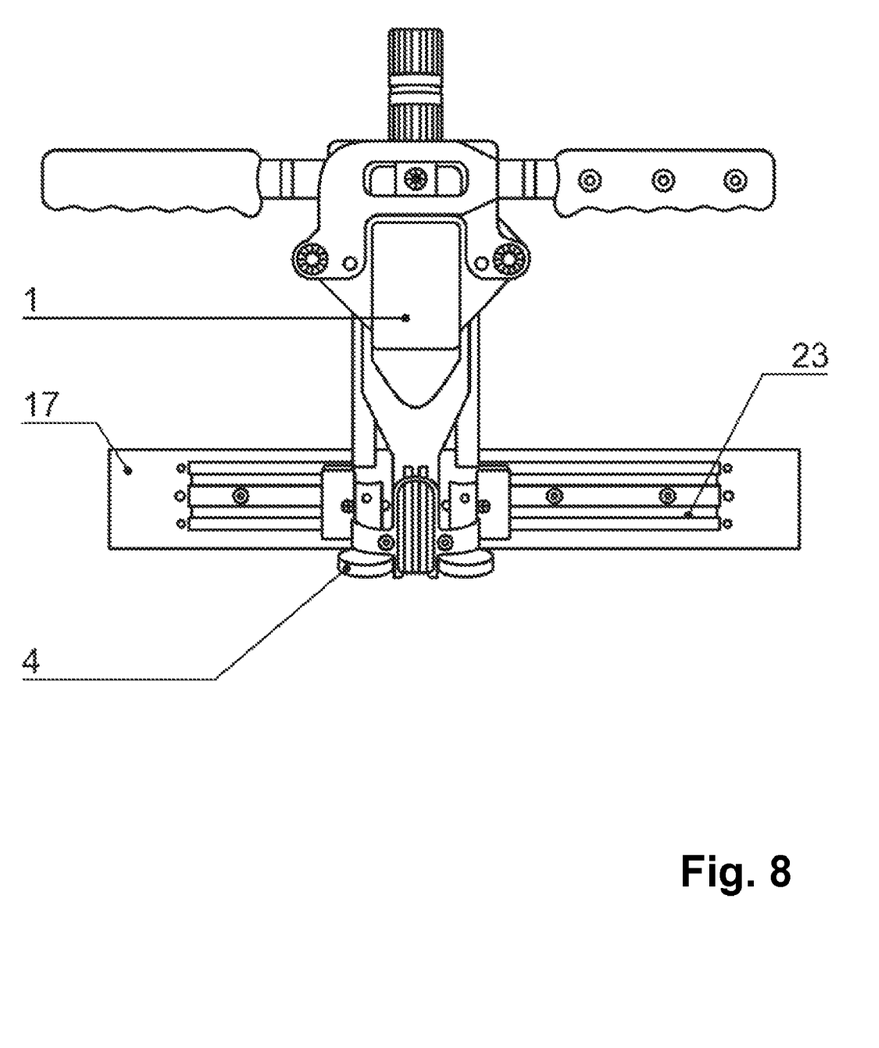
FIG. 8 shows a schematic illustration of a further embodiment for guiding the drilling apparatus.

One alternative embodiment of a guide bar 17 will be explained in more detail with reference to FIG. 8. A drilling apparatus 1 according to the invention is shown in front of the guide bar 17. The guide bar 17 has a rail 23 in which the feet 4 of the drilling apparatus 1 can be pushed in or inserted. The drilling apparatus 1 can therefore be moved parallel along the rail 23. The guide bar 17 can be attached to bodywork to be machined (not illustrated) by means, for example, of grippers (not illustrated).

The drilling apparatus according to the invention is designed in particular for machining metal bodywork panels, in particular high-strength metal bodywork panels, such as those used in the floor assemblies of vehicles. High-strength metal sheets such as these, which are also referred to as "tailored sheets" that is to say are in the form of composite material sheets, are distinguished by being sufficiently strong that they cannot be machined by conventional drilling apparatuses without major effort. The drilling apparatus according to the invention considerably reduces the force which the user need apply, improves the guidance of the drill, and at the same time reduces the wear on the drill.

It is self-evident that the invention is not restricted to a combination of the features described above, but that a person skilled in the art will combine all of the described features, where this is worthwhile.

LIST OF REFERENCE SYMBOLS

1 Drilling apparatus
2 Drill
3 Handle
4 Foot
5 Joint
6 Joint
7 Stop
8 Housing
9 Guide link
10 Lever arm
11 Drilling spindle
12 Screw
13 Connecting rod
14 Workpiece
15 Tip
16 Dashed line
17 Guide bar
18 Cutout
19 Guide means
20 Joint
21 Housing of the drilling spindle
22 Guide
23 Rail

The invention claimed is:

1. A drilling apparatus comprising:
at least one drill with a drive motor,
handles for manually holding the drilling apparatus, and
means for temporarily holding the drilling apparatus firmly on a workpiece to be machined,
in which the drill can be moved essentially axially by means of the handles, and wherein the means for temporarily holding the drilling apparatus firmly comprise feet that can be moved by means of the handles of the drilling apparatus, and wherein a stop on the drilling apparatus can be placed on the workpiece, in which the feet can be moved behind the stop by means of the handles on the drilling apparatus, and can be lifted off the workpiece in this way.

2. The drilling apparatus as claimed in claim 1, wherein the drilling apparatus has two handles.

3. The drilling apparatus as claimed in claim 1, wherein handles act as a lever arm on the drill.

4. The drilling apparatus as claimed in claim 1, wherein the feet are in the form of magnetic feet.

5. The drilling apparatus as claimed in claim 4, wherein the magnets are provided with at least one pull-off film.

6. The drilling apparatus as claimed in claim 1, wherein the feet are in the form of suction cups.

7. The drilling apparatus as claimed in claim 1, wherein at least one foot can be removed.

8. The drilling apparatus as claimed in claim 1, wherein the drilling apparatus has two feet, with the drill being arranged offset from a straight line which connects the center points of the feet to one another.

9. The drilling apparatus as claimed in claim 8, wherein the drill is located essentially on or offset from a straight line which rests tangentially on the feet.

10. The drilling apparatus as claimed in claim 1, wherein the movement of at least one foot is essentially limited up to the height of a stop which can be placed on the workpiece.

11. The drilling apparatus as claimed in claim 1, wherein at least one switch for operating the drill is arranged in one handle of the drilling apparatus.

12. The drilling apparatus as claimed in claim 1, wherein the drilling apparatus has a foot-operated switch for operating the drill.

13. The drilling apparatus as claimed in claim 1, furthermore comprising a guide bar which can be placed on the workpiece and has cutouts for the drill and/or guide means for the feet of the drilling apparatus.

14. The drilling apparatus as claimed in claim 13, wherein the guide means are adjustable.

15. The drilling apparatus as claimed in claim 1, wherein the drilling apparatus has at least one inclination sensor.

16. The drilling apparatus as claimed in claim 1, wherein the drill has a maximum of 10° tolerance with respect to the normal to the workpiece.

17. The drilling apparatus as claimed in claim 1, wherein the drilling apparatus is modular.

18. The drilling apparatus as claimed in claim 17, wherein the drilling apparatus has a drilling module and a housing module and a foot module and a pulling module.

19. The drilling apparatus as claimed in claim 1, wherein the drill, with a built-in drive motor, is interchangeable.

* * * * *